United States Patent [19]

Saga

[11] Patent Number: 5,802,024

[45] Date of Patent: Sep. 1, 1998

[54] INFORMATION RECORDING-REPRODUCING APPARATUS PROVIDED WITH A SPRING-SUPPORTED TYPE ONE-STAGE ACTUATOR

[75] Inventor: Yoshihiro Saga, Yokohama, Japan

[73] Assignee: Canon Kabushiki Kaisha, Tokyo, Japan

[21] Appl. No.: 659,524

[22] Filed: Jun. 6, 1996

[30] Foreign Application Priority Data

Jun. 7, 1995 [JP] Japan .................. 7-140608
May 29, 1996 [JP] Japan .................. 8-134890

[51] Int. Cl.$^6$ .................................. G11B 7/09
[52] U.S. Cl. .................. 369/44.29; 369/44.35
[58] Field of Search .................. 369/44.29, 44.35, 369/44.32, 44.34, 44.27, 44.15, 54

[56] References Cited

U.S. PATENT DOCUMENTS

| | | | |
|---|---|---|---|
| 5,210,732 | 5/1993 | Suenaga et al. | 369/44.35 |
| 5,228,018 | 7/1993 | Rokutan | 369/44.29 |
| 5,293,365 | 3/1994 | Rokutan | 369/44.29 |

FOREIGN PATENT DOCUMENTS 5-298724  11/1993  Japan .

*Primary Examiner*—Thang V. Tran
*Attorney, Agent, or Firm*—Fitzpatrick, Cella, Harper & Scinto

[57] ABSTRACT

An information recording/reproducing apparatus for effecting at least one of recording of information on and reproduction of information from a recording medium having a plurality of tracks, by using a light beam. The apparatus includes an objective lens for irradiating the recording medium with the light beam, a spring support member for supporting the objective lens for movement in a direction transverse to the tracks of the recording medium, a drive mechanism for driving the objective lens, a tracking error detector for detecting a deviation of the light beam relative to a track and for generating a tracking error signal, a servo control circuit for servo-controlling the objective lens on the basis of the tracking error signal, a seek circuit for effecting a seek operation of the light beam to a desired track while the servo control is in an OFF state and an offset circuit for supplying the drive mechanism, during the seek operation, with an offset to cancel a force applied to the objective lens due to a spring force of the spring support member relative to the desired track.

8 Claims, 9 Drawing Sheets

INFORMATION RECORDING-REPRODUCING APPARATUS PROVIDED WITH A SPRING-SUPPORTED TYPE ONE-STAGE ACTUATOR

BACKGROUND OF THE INVENTION

1. Field of the Invention

This invention relates to an information recording-reproducing apparatus (an apparatus for executing at least one of the recording and reproduction of information) such as an optical disc apparatus or a magneto-optical disc apparatus using a recording medium such as an optical card or an optical disc.

2. Related Background Art

It has heretofore often been the case that the objective lens drive device of an optical disc apparatus is comprised of two stages, i.e., a lens actuator portion for driving an objective lens within a short distance range and a linear motor portion for moving the lens actuator portion over an entire track area.

In recent years, however, in order to achieve the higher speed of access to information tracks, there has been devised an objective lens drive device by which light weight can be achieved. In Japanese Laid-Open Patent Application No. 5-298724, there is disclosed such an objective lens drive device. The objective lens drive device disclosed in Japanese Laid-Open Patent Application No. 5-298724 is shown in FIGS. 1 and 2 of the accompanying drawings. The objective lens drive device shown in these figures is designed such that an objective lens is supported by a leaf spring and by this leaf spring being flexed, the objective lens can be moved in a tracking direction in an entire track area.

The objective lens drive device will hereinafter be described with reference to FIGS. 1 and 2. Reference character 1A designates an objective lens through which a recording-reproducing spot is applied onto the surface of a disc. Reference numeral 13 denotes a tracking coil, through the center of which pass inner yokes extending parallel to each other in a tracking direction. Outer yokes 12 are connected to the inner yokes 10 at the opposite ends thereof parallel to each other, and magnets 11 are mounted on the outer yokes 12 and a magnetic circuit is formed so that a magnetic flux orthogonal to the coil spring 13 may act. Parallel leaf springs are constructed as follows. Reference character 4A designates a fixed base member fixed to the outer yokes 12. Leaf springs 4B are connected to the fixed base member 4A. A movable frame member 4C is connected to the opposite end portion of the leaf springs 4B. Leaf springs 4D are connected to the movable frame member 4C. An actuator 1 is connected to the opposite end portion of the leaf springs 4D. Thus, when the actuator 1 is driven, the leaf springs 4B are flexed, whereby the movable frame member 4C is arcuately moved. At the same time, the leaf springs 4D are flexed, whereby the objective lens 1A is moved with a straight locus. FIG. 2 shows the state of the objective lens drive device when the leaf springs 4B and 4D are flexed. The objective lens 1A is driven by the aforementioned magnetic circuit and is moved along the inner yokes 10. At this time, the parallel leaf springs 4B and 4D permit the movement of the objective lens in the tracking direction by their own flexure while supporting the objective lens. Thus, the objective lens drive device is characterized in that it does not require the aforementioned two-stage construction and the mass of the movable portion of the objective lens drive device is made much lighter in weight.

In the above-described objective lens drive device of one-stage construction, the actuator 1 is supported by the leaf springs 4B and 4D and, therefore, when the objective lens is located at a position other than a position in which the springs of the objective lens drive device are in their neutral state, there is created a spring force which tends to carry the actuator 1 to a position in which the springs 4B and 4D are in their neutral state.

A description will now be made of the operation, during the tracking, of an apparatus using the above-described objective lens drive device of one-stage construction. A block diagram of the apparatus using the objective lens drive device of one-stage construction is shown in FIG. 3 of the accompanying drawings. When a switch 707 is closed, a tracking control loop becomes closed and the tracking operation is started. A sensor 701 detects the difference between the positions of the objective lens and a track, and outputs a tracking error signal. The tracking error signal has the phase delay of its high-pass component compensated for by a phase compensation filter 702. By phase compensation being thus effected, the tracking control loop becomes capable of operating stably. The output of the phase compensation filter 702 is voltage-current-converted by a driver circuit 703 and drives the objective lens drive device 704. Thus, the objective lens drive device 704 operates so that the difference between the position of the objective lens and the position of the track may always be 0. In the manner described above, the tracking operation is performed.

A description will now be made of the seek operation in the apparatus of FIG. 3. The switch 707 is first opened to thereby open the tracking control loop. Then, in seek drive signal generation means 706, a seek drive signal is outputted to thereby start the movement of the objective lens. The seek operation is performed by speed control. A speed profile is used for the speed control. The speed profile determines the speed of the objective lens during the movement thereof at each moment in time. The speed control is a method of controlling the speed of movement so that it becomes the same as the speed profile by increasing or decreasing the actual speed so that the difference between a predetermined speed profile and the actual speed may become 0. First, a speed profile corresponding to a given seek distance is determined. Then, the objective lens is actually driven and the speed of movement of the objective lens at this time is measured. The speed at which the objective lens is actually moved is determined by counting the number of tracks traversed within a predetermined time, by the use of track count means 705. On the basis of this, the difference between the speed profile and the speed at which the objective lens is actually moved is determined at each predetermined time interval, and on the basis of the result thereof, the value of the seek drive signal is increased or decreased.

When the movement of the objective lens is terminated in the manner described above, the switch 707 is again closed to thereby resume the tracking operation.

However, in a case wherein an optical disc apparatus is constructed by the use of the aforedescribed objective lens drive device of one-stage construction, when the objective lens effects tracking on a track in a position other than the intermediate circumference portion of a disc, i.e., a position in which the leaf springs generate a force which tends to return the objective lens to its neutral position, the force of the springs is applied to the objective lens portion. This force provides disturbance to the tracking control loop and therefore, the position of the objective lens is offset relative to the track on the disc. This offset causes a reading error for reading information on the disc or a writing error of writing information into the disc.

Also, when the seek operation is performed, there arises the problem that during the time after tracking control has been stopped until seek control is started, or during the time after the seek control has been terminated until the tracking control is started, the objective lens is moved by the force of the springs and the seek operation becomes unstable. This in turn leads to the problem that the probability of success of the seek operation becomes low and an increase in access time results.

SUMMARY OF THE INVENTION

The present invention has been made in order to solve the above-noted problems and an object thereof is to decrease the offset of an objective lens relative to a track in an information recording-reproducing apparatus provided with an objective lens drive device of one-stage construction. Another object of the present invention is to decrease, in an information recording-reproducing apparatus provided with an objective lens drive device of one-stage construction, the movement of an objective lens occurring when seek control and tracking control are changed over, to thereby achieve the stability of the seek operation.

The above objects are achieved by an information recording-reproducing apparatus for effecting at least one of recording of information on and reproduction of information from a recording medium using a light beam, provided with:

an objective lens for applying therethrough a light beam onto the medium;

a spring support member for supporting the objective lens for movement over the entire recording area of the recording medium;

a drive mechanism for driving the objective lens;

a tracking error detector for detecting a deviation of the light beam relative to a track on the medium and generating a tracking error signal;

a servo control circuit for servo-controlling the objective lens on the basis of the tracking error signal; and an offset reducing circuit for reducing an offset of the light beam relative to the track occurring from the influence of the spring support member.

The invention will hereinafter be described in detail with respect to some embodiments thereof.

DESCRIPTION OF THE PREFERRED EMBODIMENTS (First Embodiment)

Figure 4:
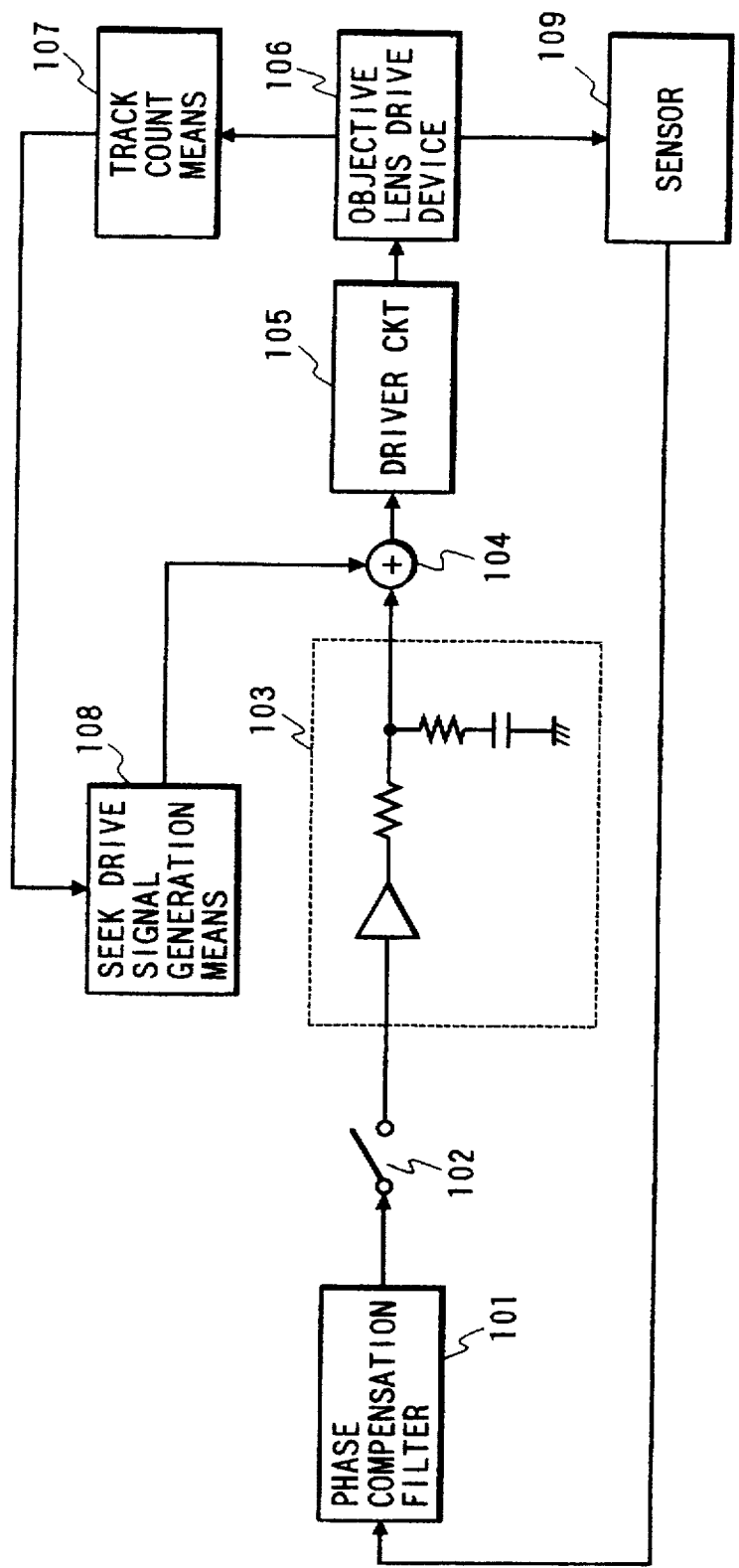
FIG. 4 is a block diagram showing the construction of a first embodiment of the present invention.

(1) Construction of the Present Embodiment (FIG. 4)

A block diagram of the construction of a first embodiment is shown in FIG. 4. In FIG. 4, reference numeral 101 designates a phase compensation filter for compensating for the delay of the phase of the high-pass component of an input signal, reference numeral 102 denotes a switch for opening and closing a tracking control loop, reference numeral 103 designates a low-pass compensation filter having a great amplification factor for a low frequency component in the input signal, reference numeral 104 denotes an adder, reference numeral 105 designates a driver circuit for voltage-current-converting the output of the adder 104 and outputting a drive signal, reference numeral 106 denotes an objective lens drive device driven by the driver circuit 105 and provided with an actuator of such structure as shown, for example, in FIGS. 1 and 2 for moving the position of an objective lens in the radial direction of a disc, reference numeral 107 designates track count means for counting the number of tracks traversed within a predetermined time, reference numeral 108 denotes seek drive signal generation means for outputting a seek drive signal and starting the movement of the objective lens, and reference numeral 109 designates a sensor for detecting the difference between the positions of the objective lens and a track and outputting a tracking error signal. In this construction, when the switch 102 is closed, there is formed a tracking control loop including the sensor 109, and by this loop, a beam spot applied from the objective lens is maintained along a predetermined track.

The apparatus shown in this figure is characterized in that the low-pass compensation filter 103, comprised of an amplifier of low impedance output and a low-pass filter comprising a resistance and a capacity at the output of the amplifier, is provided at the rear stage of the switch 102 of the tracking control loop, and the adder 104 for adding a seek drive signal is disposed at the rear stage of the low-pass compensation filter 103.

(2) Operation of the Present Embodiment

The operation of the apparatus of FIG. 4 during tracking will now be described. The switch 102 is closed, whereby the tracking control loop becomes closed, and the apparatus starts the tracking operation. The sensor 109 detects the difference between the positions of an objective lens, not shown, and a track, and outputs a tracking error signal. The tracking error signal has the delay of the phase of its high-pass component compensated for by the phase compensation filter 101. By the phase compensation being thus effected, the tracking control loop becomes capable of operating stably. The phase-compensated tracking error signal has the gain of its low-pass component amplified by the low-pass compensation filter 103. Thereby, the ability to suppress a disturbance of relatively low frequency of disturbances applied to the tracking control loop becomes great. By this, it becomes possible to decrease the offset of the position of the objective lens relative to the track caused by a spring force. The output of the low-pass compensation filter 103 is voltage-current-converted by the driver circuit 105 and drives the objective lens drive device 106. In the manner described above, the tracking operation is performed.

Figure 8A:
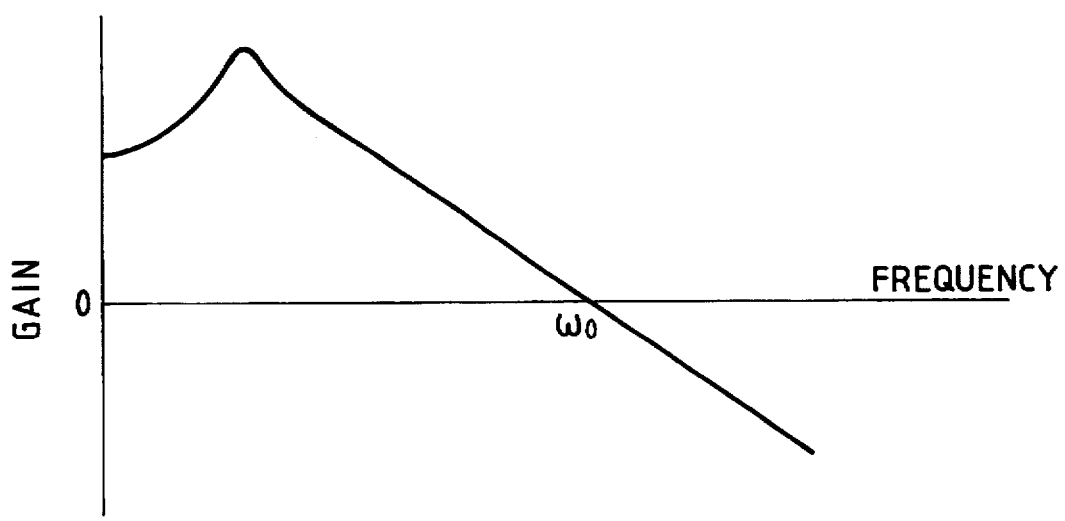
FIGS. 8A and 8B are graphs showing the one-loop transmission characteristic of a tracking control loop.
Figure 8B:
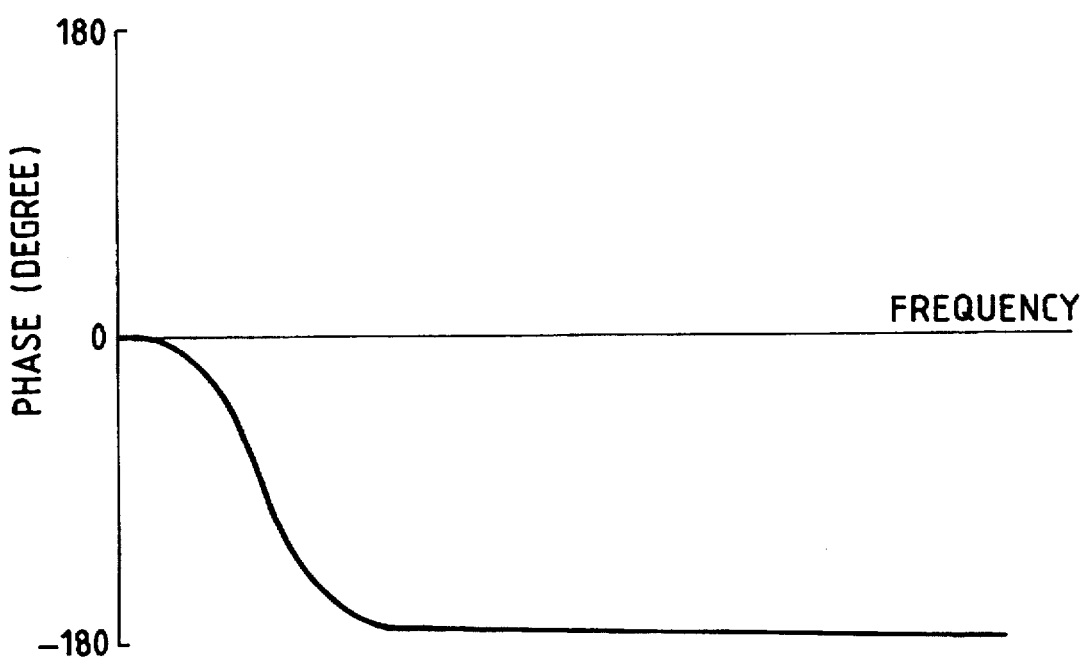
Figure 9A:
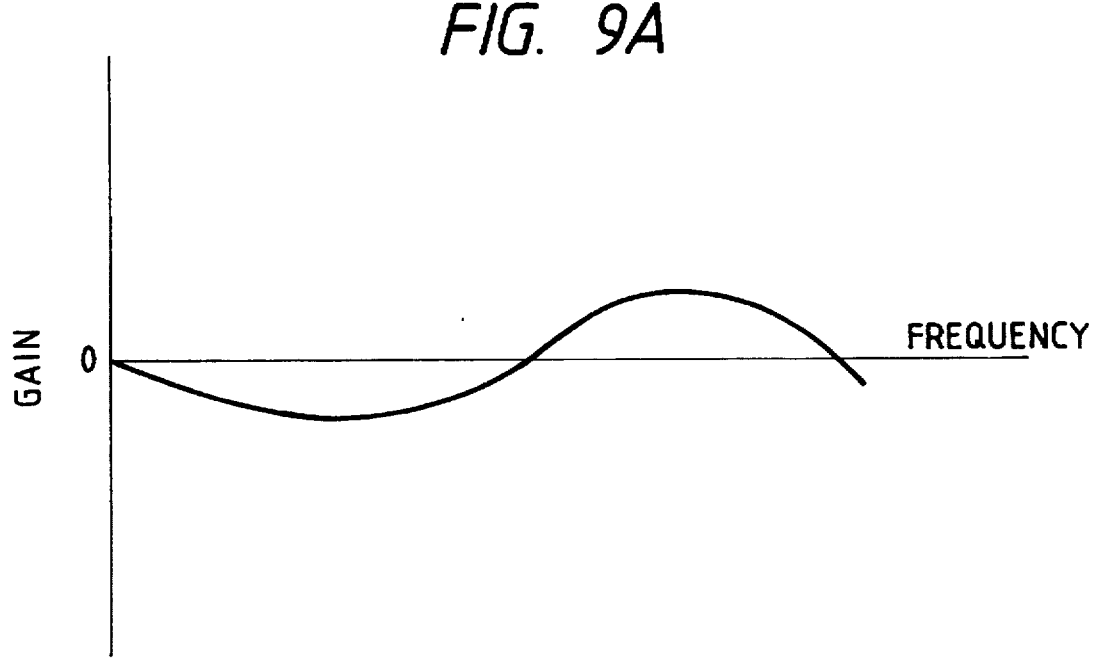
FIGS. 9A and 9B are graphs showing the characteristic of a phase compensation filter.
Figure 9B:
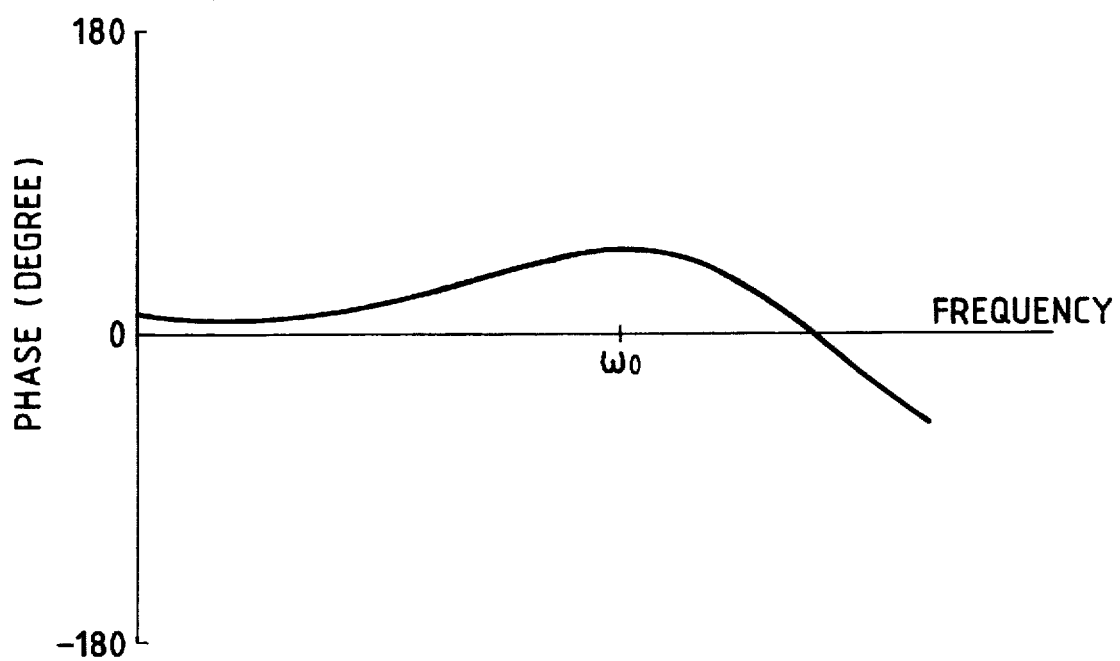

The characteristic of each filter is determined in the following manner. Let it be assumed that the one-loop transmission characteristic of the tracking control loop when the phase compensation filter has been removed is a characteristic shown in FIGS. 8A and 8B. In this case, to make the tracking control loop operate stably, it is necessary to insert the phase compensation filter so that at a point whereat the gain in the one-loop transmission characteristic of the tracking control loop is zero, the phase characteristic may be plus 40 to 60 degrees relative to −180 ° degrees. So, a phase compensation filter having such a characteristic as shown in FIGS. 9A and 9B is inserted into the tracking control loop to thereby compensate for the phase.

Figure 10A:
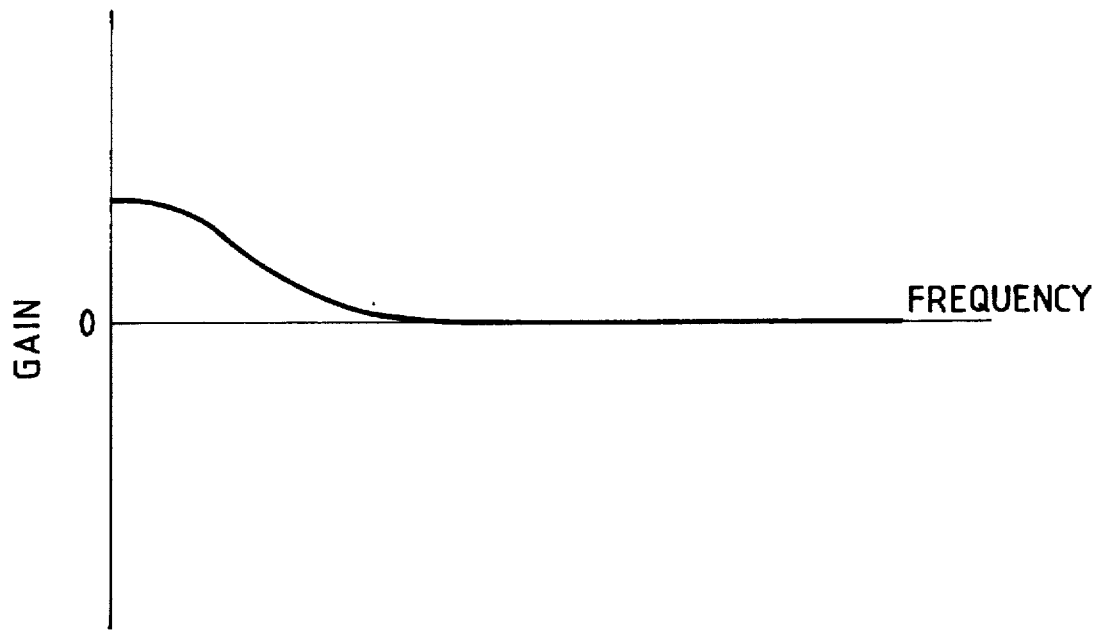
FIGS. 10A and 10B are graphs showing the characteristic of the low-pass compensation filter.
Figure 10B:
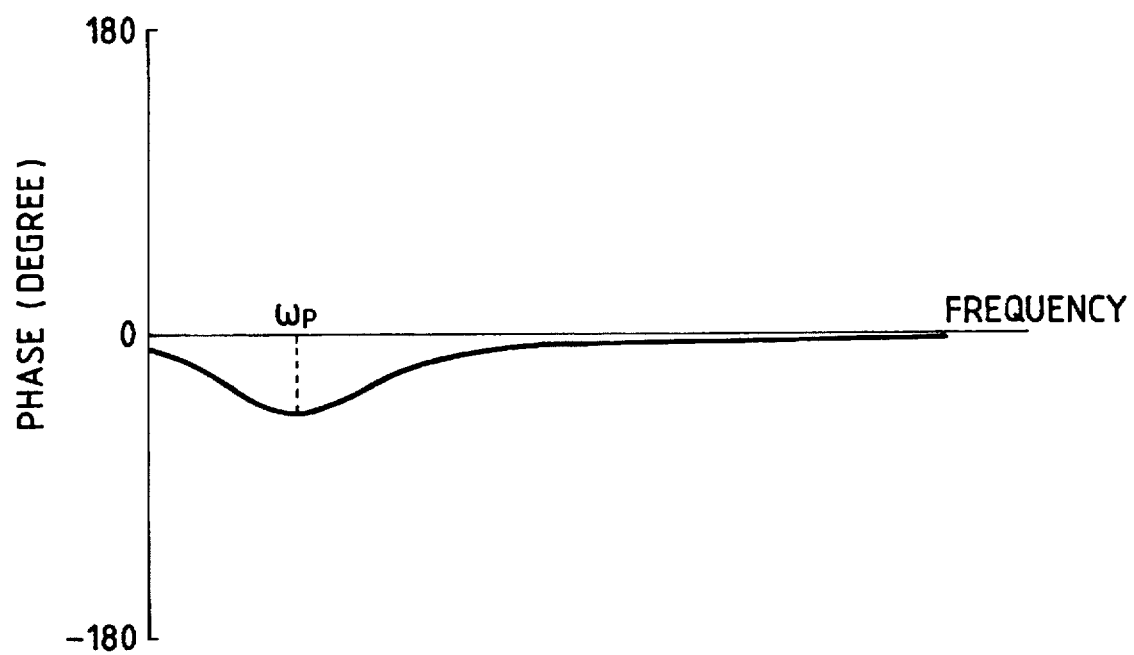

The low-pass compensation filter is a filter having such a characteristic as shown in FIG. 10, but to effect tracking control stably, it must not affect phase compensation. Accordingly, regarding the low-pass compensation filter, ω is set to a sufficiently low frequency so that in a frequency at which the phase is being compensated for by the phase compensation filter, the phase delay may be a value approximate to 0.

The seek operation in the apparatus of FIG. 4 will now be described. The apparatus is performing the tracking operation before it starts the seek operation. The seek operation is performed in the following manner. The switch 102 is first opened to thereby open the tracking control loop. At this time, a capacitor constituting the low-pass compensation filter 103 holds the potential applied thereto immediately before the switch is opened. Thereby, the potential applied to the capacitor is outputted to the output of the low-pass compensation filter 103. Therefore, the objective lens is driven so as to be fixed at the same position as when the tracking operation was being performed. Thereby, a problem arises at the start of the seek operation, because of the distance the objective lens is moved by the force of the spring.

Subsequently, in the seek drive signal generation means 108, a seek drive signal begins to be outputted, and the movement of the objective lens is started. At this time, the low-pass compensation filter 103 outputs the potential the capacitor holds, but since the seek operation is carried out by speed control, the voltage outputted by the low-pass compensation filter does not affect the movement of the objective lens. The capacitor discharges while the movement of the objective lens is being effected, and the output of the low-pass compensation filter 103 becomes 0. When the movement of the objective lens is terminated, the switch 102 is again closed and the tracking operation is resumed.

(3) Effects Peculiar to the Present Embodiment

When an optical disc apparatus is constructed by the use of the objective lens drive device of one-stage construction, it becomes possible to reduce the offset of the position of the objective lens relative to the track on the disc which is caused by the force of the spring being applied to the objective lens portion when any portion of the disc other than the intermediate circumference portion thereby is subjected to tracking.

Also, when the seek operation is performed, the problem that during the time after tracking control has been stopped until seek control is started, the objective lens is moved by the force of the spring and the seek operation becomes unstable is solved.

(Second Embodiment)

Figure 5:
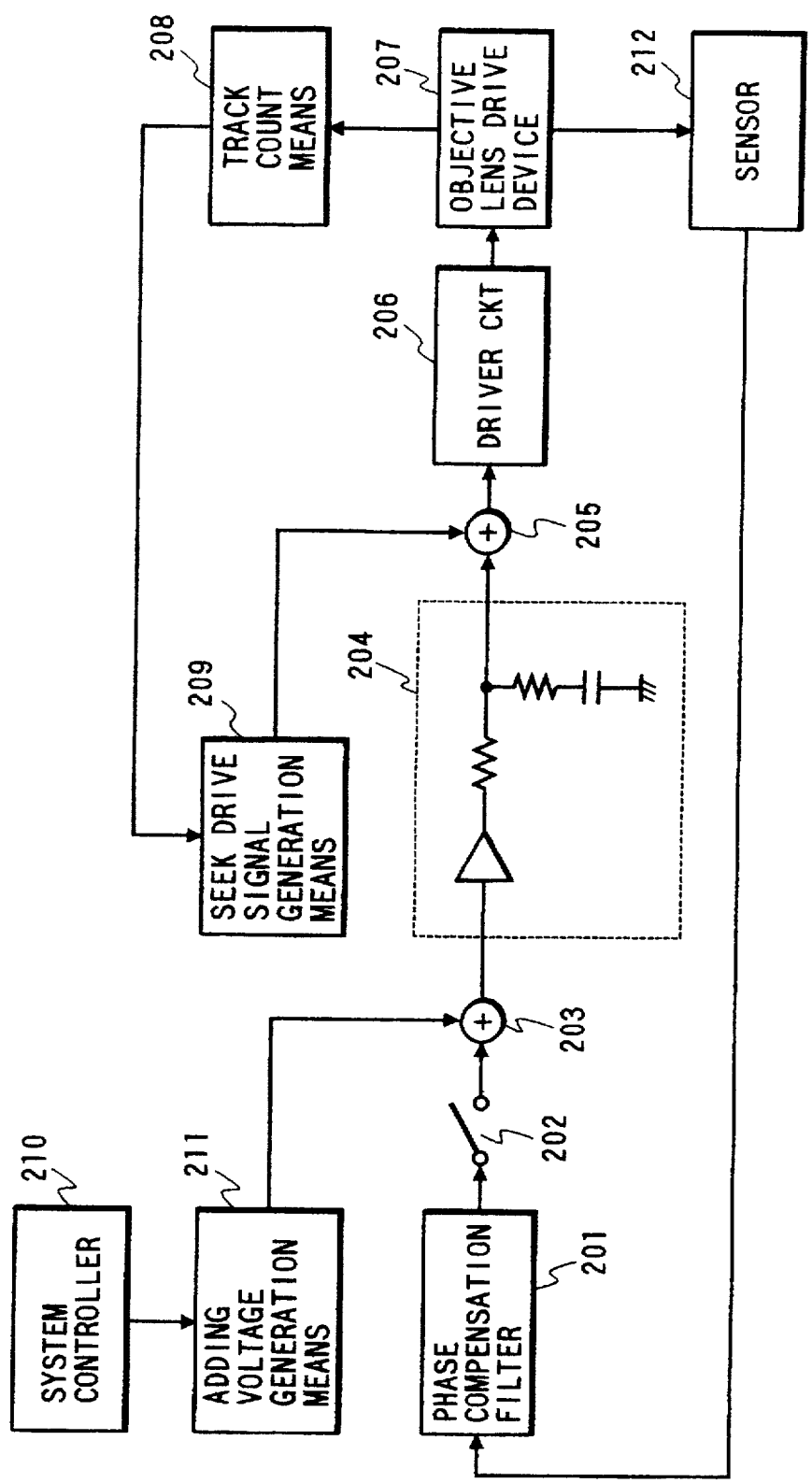
FIG. 5 is a block diagram showing the construction of a second embodiment of the present invention.

(1) Construction of the Present Embodiment (FIG. 5)

A block diagram of a second embodiment of the present invention is shown in FIG. 5. The tracking control system of an information recording-reproducing apparatus shown in this figure has a system controller 210 and adding voltage generation means 211, and has an adder 203 for adding the output of the adding voltage generation means 211 at the rear stage of the switch 202 of a tracking control loop, and further has a low-pass compensation filter 204 at the rear stage of the adder 203, and an adder 205 for adding a seek drive signal to the output of the low-pass compensation filter 204. The blocks of the other constituents are similar to those in FIG. 4 and need not be described in detail.

(2) Operation of the Present Embodiment

The operation of the apparatus of FIG. 5 during tracking will hereinafter be described. The switch 202 is closed, whereby the tracking control loop becomes closed and the tracking operation is realized. A sensor 212 detects the difference between the positions of the objective lens and the track, and outputs a tracking error signal. The tracking error signal has the delay of the phase of its high-pass component compensated for by a phase compensation filter 201. By the phase compensation being thus effected, the tracking control loop becomes capable of operating stably. The phase-compensated tracking error signal has the gain of its low-pass component amplified by the low-pass compensation filter 204. Thereby, the ability to suppress especially a disturbance of relatively low frequency of disturbances applied to the tracking control loop becomes great. By this, it becomes possible to decrease the offset of the position of the objective lens relative to the track caused by the spring force. The output of the low-pass compensation filter 204 is voltage-current-converted by a driver circuit 206 and drives objective lens drive means 207. In the manner described above, the tracking operation is performed.

The seek operation in the apparatus of FIG. 5 will now be described. This apparatus adds a DC voltage from the adder 203 during the time from the start until the termination of the seek operation. It is to be understood that the value of the DC voltage added at this time is a value corresponding to a force the objective lens receives by the spring at a point at which the objective lens arrives by the seek. That is, it is a voltage value at which the objective lens drive means 207 generates a drive force of −F in a state in which the tracking control loop is open.

Figure 6A:
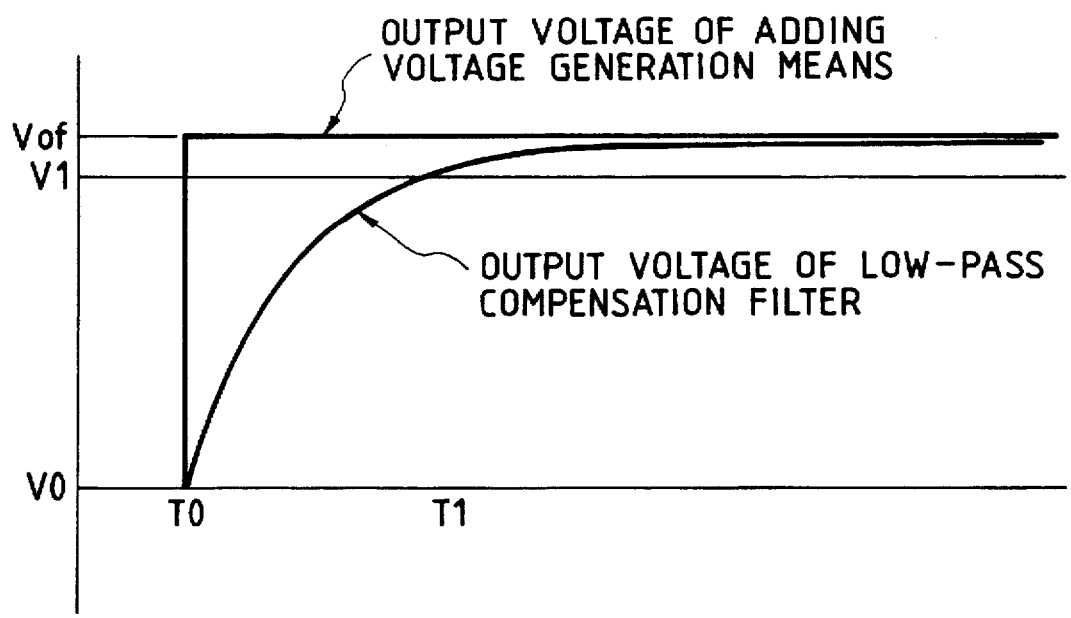
FIGS. 6A and 6B are graphs showing the states of the output of a low-pass compensation filter when the seek operation is performed in second, third and fourth embodiments of the present invention.
Figure 6B:
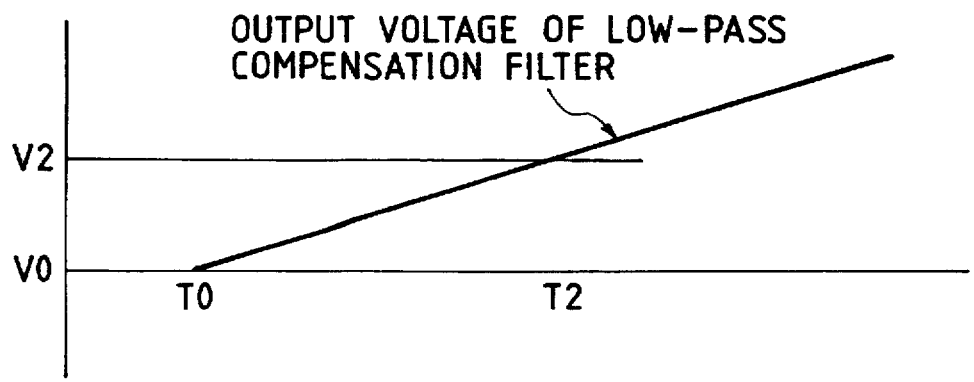

The apparatus is performing the tracking operation before it starts the seek operation. The seek operation is performed in the following manner. The switch 202 is first opened to thereby open the tracking control loop. At the same time, the aforementioned voltage value is outputted from the adding voltage generation means 211. The state of the output of the low-pass compensation filter 204 when the addition of the voltage has been done from the adder 203 is shown in FIGS. 6A and 6B. FIG. 6A shows the output of the low-pass compensation filter 204 before the start of the seek until after the termination of the seek, and FIG. 6B shows the state of the output of the low-pass compensation filter 204 at the start of the seek in FIG. 6A with the time axis enlarged. A description will now be made of the state of the operation of the apparatus when the voltage added from the adder 203 to the tracking control loop is a voltage Vof shown in FIG. 6A. In FIG. 6B, the moment when the switch 202 has been opened is represented as T0, and the moment of the start of the seek is represented as T2. At the time T0, V0 which is the potential immediately before the switch is opened is outputted to the output of the low-pass compensation filter 204. At this time, the objective lens is driven so as to be fixed at the same position as when the tracking operation was being performed. Thereafter, with the lapse of time, the output voltage of the low-pass compensation filter varies in accordance with the time constant by the capacitor and resistance which determine the characteristic of the low-pass compensation filter. Thus, at the time T2, the output voltage of the low-pass compensation filter 204 becomes V2, by which the objective lens drive means is driven. At this time, the difference between V0 and V2 is slight and therefore, the amount of movement of the objective lens is small as compared with the amount by which the objective lens is moved by the force of the spring in the apparatus according to the prior art.

The operation of the apparatus during the seek operation will now be described. In FIG. 6A, T1 is a time indicative of the termination of the seek. In the seek drive signal generation means 209, a seek drive signal begins to be outputted and the movement of the objective lens is started. At this time, such a voltage value as shown in FIG. 6A is being outputted to the output of the low-pass compensation filter 204, but since the movement of the objective lens is effected by speed control, the output voltage value of the low-pass compensation filter 204 does not affect the movement speed of the objective lens. The output of the low-pass compensation filter 204 gradually changes from V0 to Vof while the movement of the objective lens is being effected.

When the seek movement of the objective lens is terminated at T1, the switch 202 again becomes closed. At this time, the output of the low-pass compensation filter becomes V1, and the difference thereof from Vof is slight. Accordingly, the objective lens is being driven so as to balance with the force it receives by the spring and therefore, the movement of the objective lens taking place at the moment of the changeover from the seek operation to the tracking operation is slight.

(3) Effects Peculiar to the Present Embodiment

When an optical disc apparatus is constructed by the use of the objective lens drive device of one-stage construction, it becomes possible to reduce the offset of the position of the objective lens relative to the track caused by the force of the spring being applied to the objective lens portion when any portion of the disc other than the intermediate circumference portion thereof is subjected to tracking.

Also, when the seek operation is performed, the problem that during the time after tracking control has been stopped until seek control is started, and further during, the time from after the seek control has been terminated until the tracking control is started, the objective lens is moved by the force of the spring, whereby the seek operation becomes unstable is solved.

(Third Embodiment)

(1) Construction of the Present Embodiment

A third embodiment, like the second embodiment, is realized by the use of the construction of FIG. 5.

(2) Operation of the Present Embodiment

The third embodiment is characterized in that by the use of the construction of the second embodiment, the addition of a voltage from the adder 203 is effected also during the tracking operation. The seek operation in the third embodiment is the same as that in the second embodiment.

The operation of the apparatus of the present embodiment during tracking will now be described. The apparatus has the value of an adding voltage to be added corresponding to the position of the objective lens prestored in the system controller 210. The value is stored in terms of a voltage value. This voltage value is a voltage value at an addition point 203 necessary to generate a drive force balancing with the force produced by the spring at a point whereat the objective lens is positioned.

The switch 202 is closed, whereby the tracking control loop becomes closed and the tracking operation is realized. The sensor 212 detects the difference between the positions of the objective lens and the track, and outputs a tracking error signal. The tracking error signal has the delay of the phase of its high-pass component compensated for by the phase compensation filter 201. The system controller 210 transmits the address information of the position at which the tracking operation is being performed to the adding voltage generation means 211. The adding voltage generation means 211 utilizes the address information received thereby and a ROM (storing therein a table indicative of the relation between the address information and the voltage value to be added), not shown, to determine the voltage value to be added, which is added from the adder 203 to the tracking control loop. Thereby the adding voltage is added to the phase-compensated tracking error signal. Further, the tracking error signal has the gain of its low-pass component amplified by the low-pass compensation filter 204, and is voltage-current-converted by the driver circuit 206 and drives the objective lens drive means 207. In the manner described above, the tracking operation is performed.

(3) Effects Peculiar to the Present Embodiment

When an optical disc apparatus is constructed by the use of the objective lens drive device of one-stage construction, it becomes possible to decrease the offset of the position of the objective lens relative to the track on the disc caused by the force of the spring being applied to the objective lens portion when any portion of the disc other than the intermediate circumference portion thereof is subjected to tracking, more than in the first and second embodiments.

Also, when the seek operation is performed, the problem that during the time after tracking control has been stopped until seek control is started and further, during the time after the seek control has been terminated until the tracking control is started, the objective lens is moved by the force of the spring, whereby the seek operation becomes unstable is solved.

(Fourth Embodiment)

(1) Construction of the Present Embodiment

Figure 7:
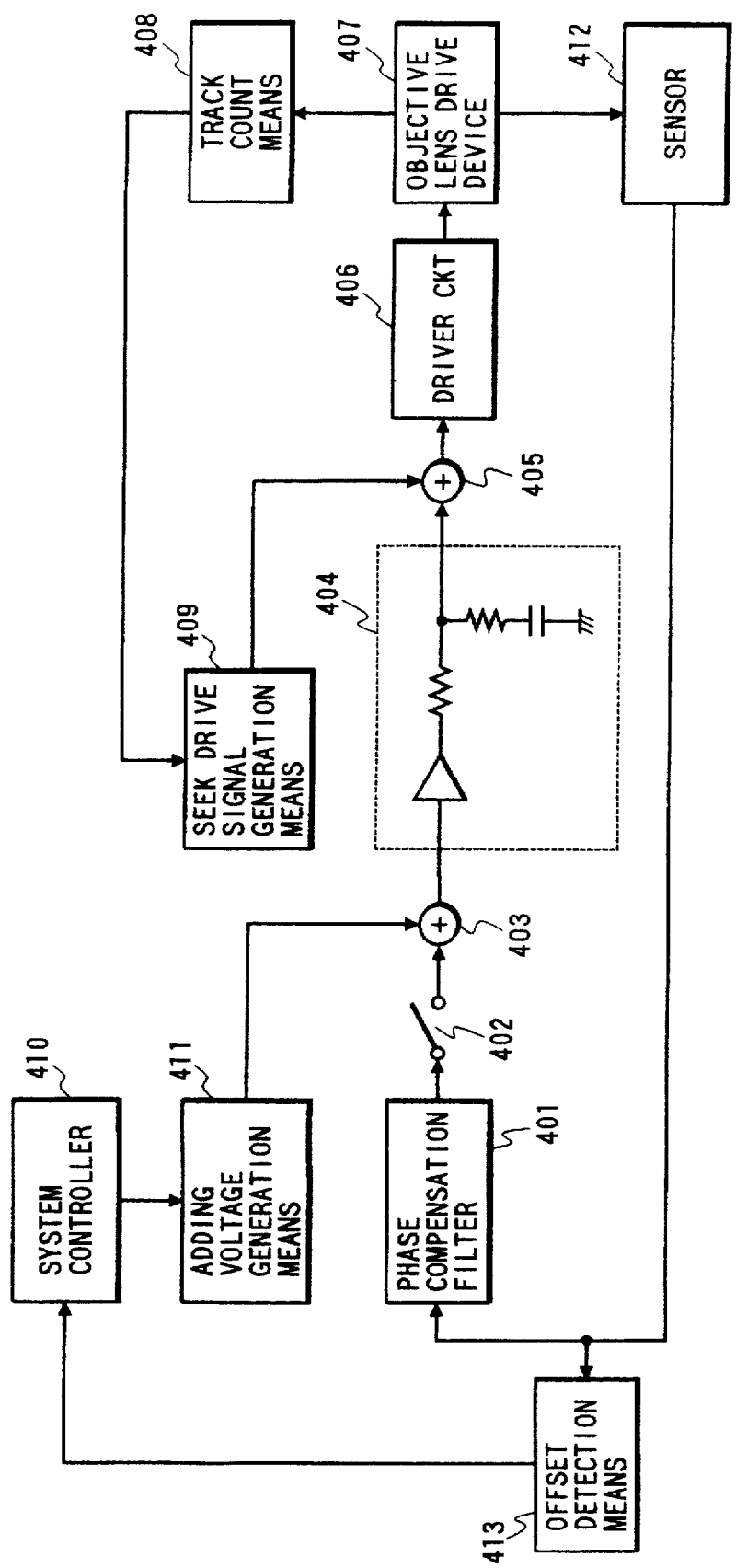
FIG. 7 is a block diagram showing the construction of a fourth embodiment of the present invention.

A block diagram of a fourth embodiment of the present invention is shown in FIG. 7. The apparatus shown in this figure is characterized by adding voltage generation means 411 for effecting the addition of a voltage to the tracking control loop, offset detection means 413 for detecting the offset created in the tracking control loop, an adder 403 for adding the output of the adding voltage generation means at the rear stage of the switch 402 of the tracking control loop, and a low-pass compensation filter 404 provided at a further rear stage so that a seek drive signal may be added to the output thereof. The other constituent blocks are similar to those in FIGS. 4 and 5 and therefore need not be described in detail.

(2) Operation of the Present Embodiment

This apparatus performs the seek operation by the same method as that of the second embodiment. The operation of the present embodiment during tracking will be described hereinafter. The switch 402 is closed, whereby the tracking control loop becomes closed and the tracking operation is realized. A sensor 412 detects the difference between the positions of the objective lens and the track and outputs a tracking error signal. The offset detection means 413 takes out the DC component of the tracking error signal and detects from it the value of offset created in the tracking error signal. The tracking error signal has the delay of the phase of its high-pass component compensated for by a phase compensation filter 401. A system controller 410 increases or decreases a value transmitted to the adding voltage generation means 411. The adding voltage generation means 411 generates an adding voltage in accordance with the value transmitted thereto from the system controller 410. This voltage is added to the tracking control loop by the adder 403. The output of the adder 403 has the gain of its low-pass component amplified by the low-pass compensation filter 404, is voltage-current-converted by a driver circuit 406 and drives an objective lens drive device 407. The objective lens is moved by the objective lens drive device 407. Thereby, the amount of offset of the objective lens relative to the track varies in accordance with the value of the voltage added from the adder 403. The system controller 410 reads the value of the offset detection means 413 to thereby control the adding voltage generation means 411 so that the output of the offset detection means 413 may become 0. Thus, the offset of the objective lens relative to the track becomes 0. Accordingly, when, for example, the value of the offset of the DC component detected by the offset detection means 413 is positive, the output voltage of the adding voltage generation means 411 supplied to the adder 403 is negative, and when the value of the offset is negative, a positive DC voltage is added. In the manner described above, the tracking operation is performed.

(3) Effects Peculiar to the Present Embodiment

Since the value of the adding voltage added to the tracking control loop is determined on the basis of the actual amount of offset created in the tracking loop, it becomes possible to obtain a greater effect of reducing the offset than in the third embodiment. Also, even if the spring experiences a change with time, it will become possible to always add an appropriate adding voltage value.

When the seek operation is performed, as in the third embodiment, it becomes possible to reduce the amount of movement of the objective lens caused by the force of the spring during the time after tracking control has been stopped until seek control is started and further, during the time after the seek control has been terminated until the tracking control is started and therefore, it becomes possible to solve the problem that the seek operation becomes unstable.

In the above-described embodiments, as shown, an example of the circuit of the low-pass compensation filter by an amplifier and a low-pass filter of CR construction has been shown as the low-pass compensation filter, whereas this is not restrictive, but the low-pass compensation filter may be any low-pass filter which is low in output impedance and is lower in pass than the phase compensation filter.

Figure 1:
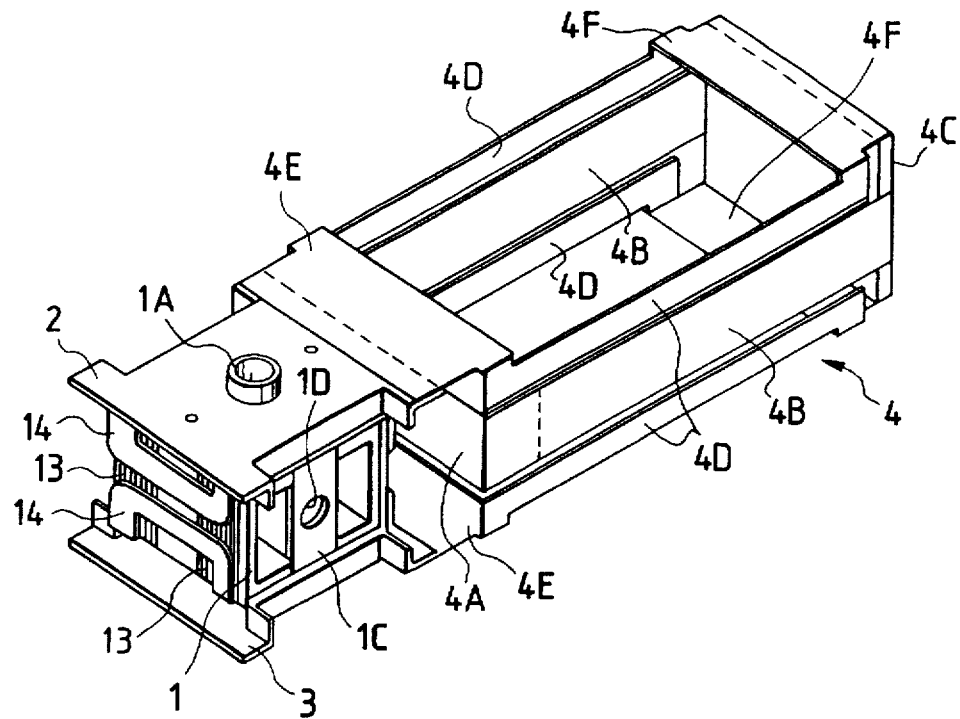
FIG. 1 shows an example of an objective lens drive device according to the prior art.
Figure 2:
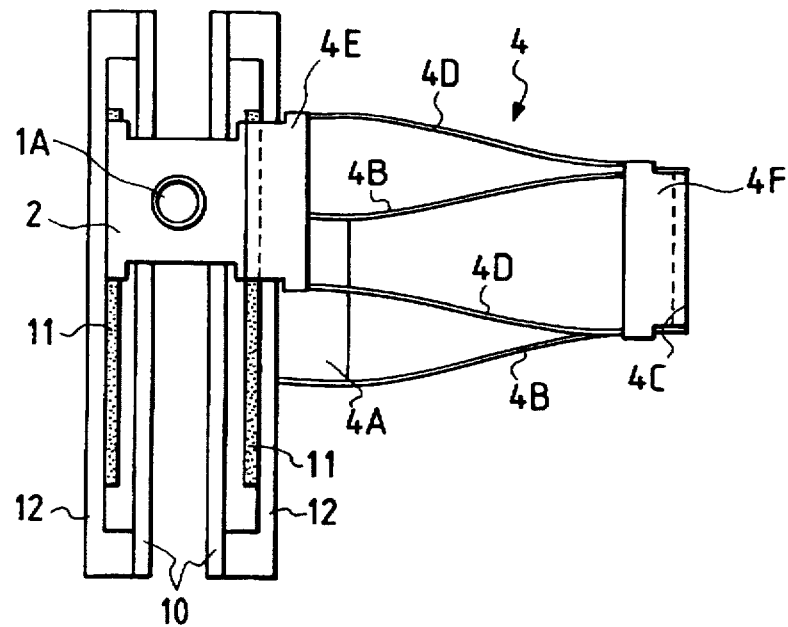
FIG. 2 is a top plan view showing the operation of the objective lens drive device shown in FIG. 1.
Figure 3:
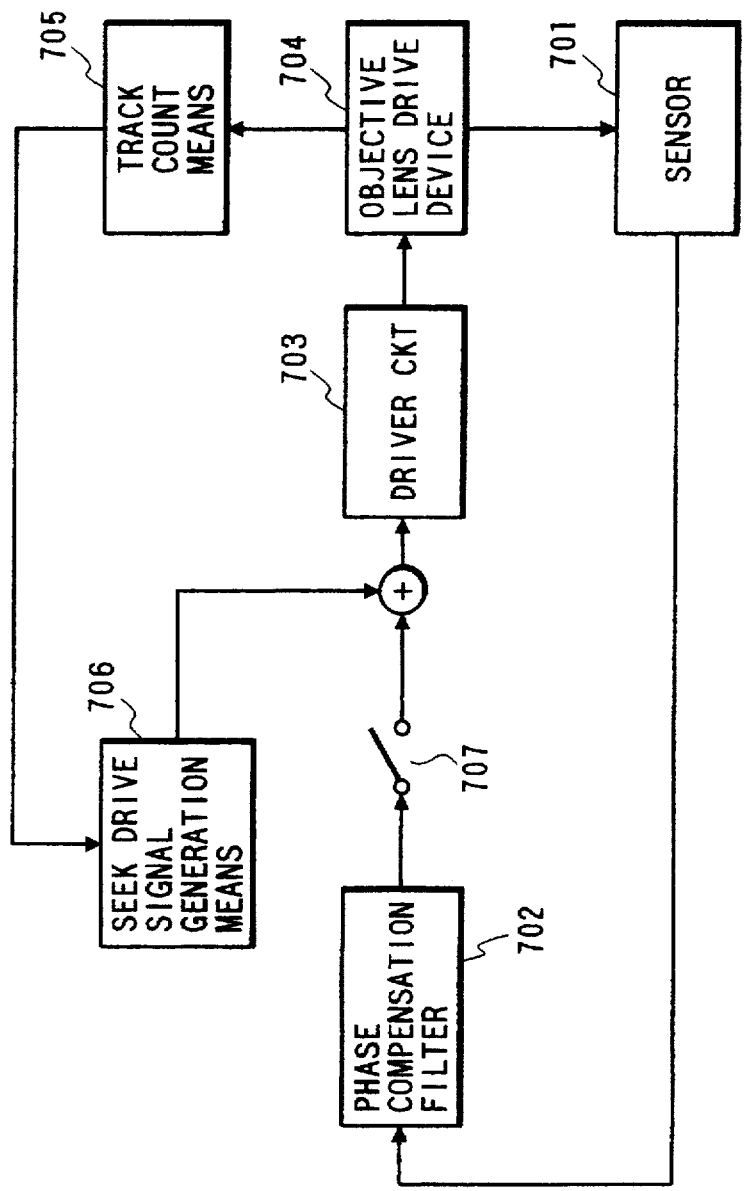
FIG. 3 is a block diagram showing a construction according to the prior art.

As the objective lens drive device in the above-described embodiments, there has been shown an example in which provision is made of the resilient member shown in FIGS. 1 and 2, whereby it is made possible to move the objective lens portion in the entire track area to thereby construct the device of one stage, but even in a case wherein these are constructed of two stages, i.e., a lens actuator portion and a linear motor portion, the present invention may of course be applied when much time is required for the method of changeover of tracking servo and seek servo.

Also, the present invention is particularly effective when the actuator portion for moving the objective lens uses a resilient member, but the present invention can also be applied to an information recording-reproducing apparatus provided with a lens actuator portion constructed of a member having a characteristic corresponding to that of the resilient member, thereby achieving similar effects.

What is claimed is:

1. An information recording/reproducing apparatus for effecting at least one of recording of information on and reproduction of information from a recording medium having a plurality of tracks, by using a light beam, said apparatus comprising:

an objective lens for irradiating the recording medium with the light beam;

a spring support member for supporting said objective lens for movement in a direction transverse to the tracks of the recording medium;

a drive mechanism for driving said objective lens;

a tracking error detector for detecting a deviation of the light beam relative to a track and for generating a tracking error signal;

a servo control circuit for servo-controlling said objective lens on the basis of the tracking error signal;

a seek circuit for effecting a seek operation of the light beam to a desired track while the servo control is in an OFF state; and an offset circuit for supplying said drive mechanism, during the seek operation, with an offset to cancel a force applied to said objective lens due to a spring force of said spring support member relative to the desired track.

2. An apparatus according to claim 1, wherein said offset circuit is a phase compensation filter for amplifying a gain of the low frequency component of the tracking error signal.

3. An apparatus according to claim 1, wherein said servo control circuit is provided with a switch to cause the servo control to be in an OFF state, and said offset circuit includes a circuit for holding the tracking error signal immediately after the servo control is switched to the OFF state.

4. An apparatus according to claim 3, wherein said holding circuit is a capacitor.

5. An apparatus according to claim 1, wherein said offset circuit further comprises adder means for generating an offset signal corresponding to a position of the light beam on the recording medium when said servo circuit is in the ON state, and for applying the offset signal to the servo control circuit.

6. An apparatus according to claim 5, wherein said offset circuit further comprises a circuit for detecting an amount of the offset from a DC component of the tracking error signal, and said adder means generates the offset signal on the basis of the detected amount of offset.

7. An apparatus according to claim 1, wherein said offset circuit functions only when the servo control is in the OFF state.

8. An apparatus according to claim 1, wherein said servo control circuit comprises a phase compensation filter for compensating for a phase delay of a high frequency component of the tracking error signal, and said offset circuit is provided at the rear stage of the phase compensation filter.

* * * * *

UNITED STATES PATENT AND TRADEMARK OFFICE
CERTIFICATE OF CORRECTION

PATENT NO. : 5,802,024

DATED : September 1, 1998

INVENTOR(S): YOSHIHIRO SAGA

It is certified that error appears in the above-identified patent and that said Letters Patent is hereby corrected as shown below:

COLUMN 5,
Line 8, "-180°" should read -- -180--; and
Line 15, "$\omega$" should read --$\omega p$--.

COLUMN 7,
Line 40, "further during," should read --further, during--, and "from" should be deleted.

Signed and Sealed this

Twenty-fifth Day of May, 1999

Attest:

Q. TODD DICKINSON

Attesting Officer     Acting Commissioner of Patents and Trademarks